(12) United States Patent
Brown et al.

(10) Patent No.: US 7,582,326 B2
(45) Date of Patent: *Sep. 1, 2009

(54) METHOD OF DEFLAVORING WHEY PROTEIN USING MEMBRANE ELECTRODIALYSIS

(75) Inventors: Peter H. Brown, Glenview, IL (US); Colin P. Crowley, Wheeling, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 673 days.

This patent is subject to a terminal disclaimer.

(21) Appl. No.: 11/209,105

(22) Filed: Aug. 22, 2005

(65) Prior Publication Data

US 2005/0276904 A1 Dec. 15, 2005

Related U.S. Application Data (63) Continuation-in-part of application No. 10/784,404, filed on Feb. 23, 2004, now abandoned, and a continuation-in-part of application No. 10/784,699, filed on Feb. 23, 2004.

(51) Int. Cl.
*A23J 1/20* (2006.01)
(52) U.S. Cl. ......................... 426/657; 426/422; 426/495; 426/583
(58) Field of Classification Search .................. 426/657, 426/422, 495, 583
See application file for complete search history.

(56) References Cited

U.S. PATENT DOCUMENTS

| | | | |
|---|---|---|---|
| 2,631,100 A * | 3/1953 | Aten et al. | .................. 426/239 |
| 2,848,403 A | 8/1958 | Rosenberg | |
| 3,165,415 A | 1/1965 | Kilburn et al. | |
| 3,615,664 A | 10/1971 | Francis | |
| 3,845,226 A | 10/1974 | Goujard | |
| 3,852,491 A | 12/1974 | Malzahn | |
| 3,876,805 A | 4/1975 | Craig et al. | |
| 3,905,886 A * | 9/1975 | Wang | ......................... 204/532 |
| 3,995,071 A | 11/1976 | Goodnight, Jr. | |

(Continued)

FOREIGN PATENT DOCUMENTS

DE 28 46 502 A1 10/1979

(Continued)

OTHER PUBLICATIONS

Robert. S. Shallenberger, "Taste Chemistry", Blackie Academic & Professional, London, pp. 290-291 and pp. 450-451.

(Continued)

*Primary Examiner*—Anthony Weier
(74) *Attorney, Agent, or Firm*—Fitch, Even, Tabin & Flannery (57) ABSTRACT

Whey protein materials such as whey from cheese making processes, whey protein concentrates, and whey protein isolates, are deflavored by adjusting the pH of an aqueous composition of such whey protein materials to about 8.0 to about 12 using membrane electrodialysis to solubilize the whey proteins and to release the flavoring compounds and thereafter passing the pH-adjusted composition to an ultrafiltration membrane having a molecular weight cutoff up to about 50,000 Daltons under conditions at which the flavoring compounds pass through the membrane, leaving the retained whey protein material with improved flavor.

21 Claims, 5 Drawing Sheets

U.S. PATENT DOCUMENTS

| | | | |
|---|---|---|---|
| 3,996,702 A | 12/1976 | Leahy | |
| 4,043,896 A | 8/1977 | Ahlgren | |
| 4,072,670 A | 2/1978 | Goodnight, Jr. | |
| 4,088,795 A | 5/1978 | Goodnight, Jr. et al. | |
| 4,091,120 A | 5/1978 | Goodnight, Jr. | |
| 4,100,024 A | 7/1978 | Adler-Nissen | |
| 4,105,803 A | 8/1978 | Peng | |
| 4,125,527 A * | 11/1978 | Buhler et al. | 530/414 |
| 4,138,501 A | 2/1979 | Chaveron et al. | |
| 4,205,090 A | 2/1979 | Chaveron et al. | |
| 4,172,828 A | 10/1979 | Davidson et al. | |
| 4,211,694 A | 7/1980 | Youngquist | |
| 4,253,928 A | 3/1981 | Blytas et al. | |
| 4,322,275 A | 3/1982 | Jain | |
| 4,351,710 A | 9/1982 | Jain | |
| 4,420,425 A | 12/1983 | Lawhon | |
| 4,432,999 A | 2/1984 | Bily | |
| 4,477,480 A | 10/1984 | Seidel et al. | |
| 4,478,854 A | 10/1984 | Adler-Nissen et al. | |
| 4,497,836 A | 2/1985 | Marquardt et al. | |
| 4,530,788 A | 7/1985 | Chang | |
| 4,623,550 A | 11/1986 | Willard | |
| 4,632,903 A | 12/1986 | Boyce et al. | |
| RE32,725 E | 8/1988 | Howard et al. | |
| 4,761,186 A | 8/1988 | Schara et al. | |
| 4,770,891 A | 9/1988 | Willard | |
| 4,908,224 A | 3/1990 | Yoder | |
| 4,963,253 A | 10/1990 | Yen | |
| 4,971,701 A | 11/1990 | Harju et al. | |
| 5,013,573 A | 5/1991 | Bodor et al. | |
| 5,077,062 A | 12/1991 | Ernster | |
| 5,100,679 A | 3/1992 | Delrue | |
| 5,160,758 A | 11/1992 | Parks et al. | |
| 5,260,080 A | 11/1993 | Noel | |
| 5,433,969 A | 7/1995 | McMindes et al. | |
| 5,626,899 A | 5/1997 | Payne et al. | |
| 5,658,714 A | 8/1997 | Westfall et al. | |
| 5,691,165 A | 11/1997 | Nielsen et al. | |
| 5,746,920 A | 5/1998 | Boergardts et al. | |
| 5,780,439 A | 7/1998 | Mendy et al. | |
| 5,858,442 A | 1/1999 | Payne et al. | |
| 5,936,069 A | 8/1999 | Johnson | |
| 6,022,702 A | 2/2000 | Tsumura et al. | |
| 6,068,865 A | 5/2000 | Lee et al. | |
| 6,126,973 A | 10/2000 | Tsumura et al. | |
| 6,136,351 A | 10/2000 | Nauth et al. | |
| 6,139,901 A | 10/2000 | Blazey et al. | |
| 6,204,362 B1 | 3/2001 | Kitamura et al. | |
| 6,221,423 B1 | 4/2001 | Cho et al. | |
| 6,291,009 B1 | 9/2001 | Cohen et al. | |
| 6,326,048 B1 | 12/2001 | Kato et al. | |
| 6,383,531 B1 | 5/2002 | Gottemoller et al. | |
| 6,399,135 B2 | 6/2002 | Gottemoller et al. | |
| 6,402,917 B1 | 6/2002 | Emery et al. | |
| 6,413,569 B1 | 7/2002 | Borders et al. | |
| 6,432,457 B1 | 8/2002 | Jones | |
| 6,479,089 B2 | 11/2002 | Cohen | |
| 6,482,305 B1 | 11/2002 | Mani | |
| 6,495,187 B1 | 12/2002 | Borders | |
| 6,528,622 B1 | 3/2003 | Ayers et al. | |
| 6,537,597 B1 | 3/2003 | Nakamori et al. | |
| 6,582,746 B2 | 6/2003 | Altemueller et al. | |
| 6,630,195 B1 | 10/2003 | Muralidhara et al. | |
| 6,726,943 B2 | 4/2004 | Prosise et al. | |
| 6,787,173 B2 | 9/2004 | Akashe et al. | |
| 6,841,184 B2 | 1/2005 | Porter et al. | |
| 7,094,439 B2 * | 8/2006 | Akashe et al. | 426/657 |
| 7,175,869 B2 * | 2/2007 | Brown et al. | 426/422 |
| 2001/0055642 A1 | 12/2001 | Cohen | |
| 2002/0098276 A1 | 7/2002 | Porter et al. | |
| 2002/0102346 A1 | 8/2002 | Stark et al. | |
| 2002/0106437 A1 | 8/2002 | Karleskind et al. | |
| 2002/0106440 A1 | 8/2002 | Porter et al. | |
| 2002/0114877 A1 | 8/2002 | Stark et al. | |
| 2003/0089609 A1 | 5/2003 | Liang | |
| 2004/0161512 A1 | 8/2004 | Akashe | |
| 2004/0161525 A1 | 8/2004 | Akashe | |
| 2004/0170743 A1 | 9/2004 | Akashe | |
| 2004/0170744 A1 | 9/2004 | Akashe | |
| 2004/0175474 A1 | 9/2004 | Akashe | |
| 2004/0175479 A1 | 9/2004 | Akashe | |
| 2004/0253355 A1 | 12/2004 | Akashe | |

FOREIGN PATENT DOCUMENTS

| | | |
|---|---|---|
| EP | 0 109 868 A1 | 5/1984 |
| EP | 0 467 482 A1 | 1/1992 |
| EP | 1 249 176 A1 | 10/2002 |
| EP | 1 498 498 A1 | 1/2005 |
| EP | 1 568 287 A1 | 8/2005 |
| GB | 1 313 085 A | 4/1973 |
| GB | 1 363 783 A | 8/1974 |
| GB | 1 580 051 A | 11/1980 |
| JP | 4 278057 A2 | 10/1992 |
| JP | 9 316089 A2 | 12/1997 |
| SU | 689010 A | 9/1987 |
| WO | 89/10064 A1 | 11/1989 |
| WO | 93/20713 A1 | 10/1993 |
| WO | 95/19218 A1 | 7/1995 |
| WO | 97/34696 A1 | 9/1997 |
| WO | 00/25903 A1 | 5/2000 |
| WO | 00/51440 A1 | 9/2000 |
| WO | 01/41580 A1 | 6/2001 |
| WO | 02/100186 A1 | 12/2002 |
| WO | 03/070007 A1 | 8/2003 |

OTHER PUBLICATIONS

F. Petrus Cuperus et al., Applications of Membrane Technology to Food Processing, Trends in Food Science & Technology, Sep. 1993, vol. 4, pp. 277-282.

May-Britt Hägg, Membranes in Chemical Processing, A Review of Applications and Novel Developments, Separation and Purification Methods, 1998, 27(1), pp. 51-53 and 101-105.

Anh Lam Quoc et al., Acceleration of pH Variation in Cloudy Apple Juice Using Electrodialysis with Bipolar Membranes, J. Agric. Food Chem., 2000, vol. 48, No. 6, pp. 2160-2166.

E. A. Touzopoulou et al., Effect of Heating and Acid on the Yield and Quality of Cheese Produced From UF-Concentrated Whey, Milchwissenschaft, 2000, vol. 55 (6), pp. 322-325.

* cited by examiner

METHOD OF DEFLAVORING WHEY PROTEIN USING MEMBRANE ELECTRODIALYSIS

The present application is a continuation-in-part application of U.S. patent application Ser. No. 10/784,404, filed Feb. 23, 2004, and now abandoned, U.S. patent application Ser. No. 10/784,699, filed Feb. 23, 2004, both of which are hereby incorporated by reference.

This invention relates generally to the processing of whey protein-containing materials for use in various food products. More particularly, the invention relates to a method of deflavoring whey protein materials using membrane electrodialysis for pH adjustment in order to make them acceptable in a wide range of foods.

BACKGROUND

In recent years, whey proteins have become widely used in food products, in larger part, for the health benefits obtained from their use. For example, studies suggest that whey proteins may provide a variety of health benefits such as antihypertension activity, immune system enhancement, antimicrobial activity, intestinal health enhancement, and oral hygiene activity. In some applications, the taste of the whey protein materials is not objectionable (e.g., when the taste of whey is masked). However, in some uses, such as dairy analog products, beverages and the like, and especially when the amount of whey protein is increased to the levels associated with such health benefits, the flavors found in whey protein materials may prevent their ready acceptance by the consumer. Thus, in order to extend the uses of whey protein materials, the present inventors wanted to find a method of reducing the flavor components of whey protein materials. However, it was not evident that methods which had been used previously to remove flavor components from other organic materials would be successful in the treating of whey protein materials. Organic materials, since they have complex compositions, must be tested to determine whether any given method of treating them will be satisfactory.

One example of previously employed methods to purify organic materials is found in U.S. Pat. No. 4,477,480, in which the patentees show that starch can be treated with an alkali to remove objectionable flavor components. In a commonly assigned patent, U.S. Pat. No. 4,761,186, ultrafiltration is used to purify starch. In both cases, flavor components are removed from the starch. The '480 patent solubilizes the flavor components so that they can be washed out of the relatively insoluble starch. The '186 patent uses ultrafiltration to remove the flavor components as permeate, while the insoluble starch remained in an aqueous slurry. By contrast, the present invention separates flavor components from soluble high molecular weight whey proteins.

There are many articles and patents which relate to processing soy materials in order to recover the protein content and which at the same time reduce the flavor compounds to make the proteins more acceptable in food products. However, these previous disclosures were not specifically directed to removal of flavoring compounds and recovering as much of the protein as possible. One example is U.S. Pat. No. 4,420,425 in which protein components of soy are solubilized at a pH of 7 to 11, preferably about 8 and, after ultrafiltration through a membrane having a molecular weight cut off above 70,000, are recovered by spray drying the retained soy proteins. In one variant, only a portion of the protein is solubilized at lower pH values and subjected to ultrafiltration with a membrane having a cutoff preferably above 100,000 molecular weight; the product was found to have improved color and flavor. A higher cutoff valve would be expected to result in a loss of valuable proteins. In another patent, U.S. Pat. No. 5,658,714, a soy flour slurry is pH-adjusted to the range of 7 to 10 to solubilize proteins, which are then passed through an ultrafiltration membrane wherein phytate and aluminum (Al) are retained, presumably as solids. While the molecular weight cutoff of the membrane was not given, it is assumed that the pore size was large in order to be able to pass the soluble proteins. Both of these patents contain extensive discussions of the efforts of others in the processing of soy materials; neither teaches or suggests the control of pH during the ultrafiltration process.

In a group of related patents, Mead Johnson Company disclosed processes for solubilizing soy proteins by raising the pH of an aqueous solution of soy materials and recovering the proteins which are said to have a bland taste. The processes are principally directed to concentrating proteins rather than removing flavor compounds. In U.S. Pat. No. 3,995,071, the pH was increased to 10.1 to 14 (preferably 11 to 12) to solubilize soy proteins, after which the pH was lowered to about 6 to 10 and the mixture subjected to ultrafiltration with a membrane having a molecular weight cutoff of 10,000 to 50,000 Daltons; the proteins were retained while discarding carbohydrates and minerals. In U.S. Pat. No. 4,072,670, emphasis was placed on removing phytates and phytic acid by solubilizing proteins at a pH of 10.6 to 14 and a temperature of 10 to 50° C. to render the phytates and phytic acid insoluble, then separating them, and finally acidifying the solution to a pH of about 4 to 5 to precipitate the soy proteins. In U.S. Pat. No. 4,091,120 soy proteins were solubilized at a pH less than 10, preferably 7 to 9, and ultrafiltration was used to separate the proteins as retentate, while passing carbohydrates as permeate. These patents do not teach or suggest control of the pH during the ultrafiltration process.

The present inventors have surprisingly discovered that related processes can be advantageously applied to whey protein materials to remove undesirable flavor components to obtain a deflavored whey protein material that can be incorporated into many different food products.

Electrodialysis apparatus is described in U.S. Pat. Nos. 6,537,436, 6,482,305 and 6,402,917. None of these patents describe the use of electrodialysis treatment in the processing of whey protein materials.

SUMMARY

Broadly, the invention is a process for preparing an aqueous whey composition having a whey protein concentration of about 1 to about 50 percent, which is pH-adjusted using membrane electrodialysis to solubilize the whey protein content and to release the flavoring compounds. Then the composition is subjected to ultrafiltration, while maintaining pH control, using a membrane capable of retaining substantially all of the protein content of the whey protein material while removing flavoring components as permeate. As noted above, the present inventors have now surprisingly discovered that a method used for deflavoring soy protein materials and methods for adjusting pH using membrane electrodialysis can be combined and used for deflavoring whey protein materials. The present process, as applied to whey proteins, can be run under basic conditions as desired to produce deflavored whey protein material.

The deflavored whey protein materials prepared by the present methods are ideally suited for use in dairy and non-dairy beverages, smoothies, health drinks, confectionary type products, nutritional bars, cheeses, cheese analogs, dairy and non-dairy yogurts, meat and meat analog products, cereals, baked products, snacks, and the like.

The present invention provides methods for deflavoring whey proteins. In addition to the removal of off-flavors, the present invention also allows the efficient removal of lactose, thereby allowing concentration of the whey proteins to high levels. Typically whey protein contains about 70 to about 80 percent (dry basis) lactose. Generally, levels of lactose less than about 15 percent (dry basis) can be obtained in the deflavored whey protein. By extensive ultrafiltration/difiltration (i.e., greater than 5 wash cycles and typically in the range of about 6 to 7 wash cycles), the level of lactose can be reduced to less than about 8 percent (dry basis). Moreover, the deflavored whey protein materials can be prepared containing greater than about 50 percent protein (on a dry basis), and preferably about 65 to about 95 percent protein; obtaining higher levels of protein (generally greater than about 85 percent) require extensive ultrafiltration/diafiltration. Thus, it becomes possible to incorporate whey protein in conventional food products at sufficiently high levels (generally sufficient to provide about 2.5 to about 30 g whey protein per single serving size (generally about 25 to about 100 g for solid food products and about 100 to about 300 ml for liquid food products) to provide health benefits of whey protein. Prior to this invention, incorporation of whey proteins at such levels generally resulted in significant off-flavors and, therefore, only very limited acceptance by consumers. Moreover, the removal of lactose may allow the use of such food products by lactose-intolerant consumers; generally, in such cases, at least about 95 percent of the lactose should be removed.

In one aspect, the invention is a method of deflavoring whey protein materials which includes preparing an aqueous composition of the whey protein material containing flavoring compounds. The pH of the aqueous composition is adjusted to a basic range of about 8.5 to about 12 with membrane electrodialysis or to an acidic range of about 2.4 to about 4 using membrane electrodialysis. The pH adjustment is effective for solubilizing the protein content of the whey protein material and for releasing the flavor components. The pH-adjusted composition is then passed adjacent to an ultrafiltration membrane having pores which provide a molecular weight cutoff up to 50,000 Daltons, while maintaining the pH in the same range as to which the aqueous composition was adjusted, thus retaining substantially all of the whey protein content, while passing through the pores the flavor producing compounds. Following removal of the off-flavors, the pH of the deflavored protein solution is adjusted to the desired final pH by membrane electrodialysis.

In another aspect (herein termed the "basic mode of operation"), the invention includes adjusting the pH to the range of about 8 to about 12 with membrane electrodialysis. The pH may be maintained in this range with membrane electrodialysis and/or by using an alkali such as sodium, potassium or calcium hydroxides to maintain the solubility of the whey protein content and release the flavor compounds, making it possible to separate such compounds by ultrafiltration. Importantly, the pH in this basic mode of operation is also controlled within the range of about 8 to about 12 during the ultrafiltration process. Following removal of the off-flavors, the pH of the deflavored protein solution is adjusted to the desired final pH by membrane electrodialysis.

Native whey proteins (i.e., undenatured) are generally soluble over a wide range of pH values. Denaturing of such protein, as often occurs during processing (e.g., cheese manufacture, pasteurization, elevated temperature, ultrafiltration, and the like) results in decreased solubility (especially around the isoelectric point of about 5.2). Adjusting the final pH of the deflavored whey protein in essentially the same range as its ultimate use in a food product allows the maintenance of desired solubility. Using a deflavored whey protein such that the final pH adjustment is neutral (pH 6.5-8.0) in a neutral or basic food product, and using a deflavored whey protein such that the final pH adjustment is acidic (below pH 6.5) but above the isoelectric point in an acidic food products avoids modifying the pH of the deflavored whey protein (and potentially passing it through its isoelectric point) and thereby provides maximum solubility in the food product.

In one embodiment, the invention is a method for deflavoring whey protein materials in a continuous process wherein a pH-adjusted aqueous mixture of whey protein materials is passed adjacent an ultrafiltration membrane to separate the flavor components. The pH is maintained at about 8.5 to about 12 for the basic mode of operation during the ultrafiltration with membrane electrodialysis and/or by the addition of the appropriate amount of an appropriate pH-altering material (i.e., a base). The permeate containing flavor components, lactose, minerals, and water is passed adjacent a reverse osmosis membrane to dewater the permeate and the separated water can be recycled to join recycled retentate and fresh pH-adjusted whey materials. A portion of the retentate is continually removed and the deflavored whey protein materials recovered.

In a preferred embodiment, the invention is a method for deflavoring whey protein materials in a batch or semi-continuous process wherein a pH-adjusted aqueous mixture of whey protein materials is passed adjacent an ultrafiltration membrane, the permeate is separated for recovery of the flavor components, and the retentate may be recycled to join fresh pH-adjusted whey protein materials. Water is added periodically or continuously to replace the water lost to the permeate and to adjust the concentration of whey materials in the combined stream to a predetermined level. Recycled retentate and/or added water may be subjected to membrane electrodialysis, and/or a pH-altering material (e.g., a base or an acid) can be added to the recycled retentate or added water to control the pH to the desired range during the ultrafiltration process. The process is continued until essentially all of the flavoring compounds have been removed. If desired, the process can also be continued until sufficient levels of lactose removal have been obtained; such reduced lactose materials may be used in food products directed to lactose-intolerant individuals. Following removal of the off-flavors, the pH of the deflavored protein solution is adjusted to the desired final pH by membrane electrodialysis.

In another preferred embodiment, the present invention provides a method for preparing deflavored whey protein material, said method comprising:

(a) preparing an aqueous composition of a whey protein material containing soluble whey proteins and flavoring compounds;

(b) adjusting the aqueous composition of (a) to a basic pH in the range of about 8.0 to about 12 with membrane electrodialysis;

c) passing the aqueous composition of (b) adjacent to an ultrafiltration membrane having a molecular weight cutoff up to about 50,000 Daltons, while maintaining the pH in the same range as adjusted in step (b), under suitable ultrafiltration conditions wherein the flavor compounds pass through the membrane, thereby deflavoring the whey protein material and retaining substantially all of the soluble whey proteins;

(d) adusting the pH of the aqueous composition to the desired pH using membrane electrodialysis, and (e) recovering the soluble whey proteins retained by the ultrafiltration membrane to obtain the deflavored whey protein material. It is generally preferred that any insoluble materials be removed from the whey protein composition prior to the ultrafiltration step, in order to minimize fouling the ultrafiltration membrane. Removal of such insoluble materials (which could include, for example cheese fines, fat globules, and casein aggregates using whey derived from a cheese making process) could be carried out at any time before ultrafiltration step, including before the preparing the initial aqueous solution of step (a).

The ultrafiltration membrane used in the method of the invention will have a molecular weight cutoff up to 50,000 Daltons, preferably 1,000 to 50,000, most preferably about 5,000 to 10,000.

DETAILED DESCRIPTION

Whey Protein Materials. Whey proteins have high nutritive value for humans. In fact, the amino acid composition of such whey proteins is close to an ideal composition profile for human nutrition. Unfortunately, use of such whey proteins in food compositions have been limited due to undesirable odors and/or flavors as well as other organoleptic problems associated with whey proteins. Normal whey protein materials generally have significant lactose, milky, and animal flavors which can impact the flavor profiles of food products, especially otherwise bland food products. Off flavors in whey protein materials are generally attributed to lipid oxidation of unsaturated fatty acids during, or after, the cheese making process and/or to Maillard browning reactions. Lipid oxidation can result in formation of volatile aldehydes, ketones, esters, and alcohols, which appear to contribute to a cardboard-like flavor. Typically, whey protein materials contribute, or provide, off flavors described as cardboardy, musty, metallic, sour, cooked, astringent, and diacetyl; see, for example, Laye et al., Milchwissenschaft, 50, 268-272 (1995); Carunchia Whetstine et al., J. Dairy Sci., 86, 439-448 (2003).

The present inventors have found that defects normally associated with whey proteins can be significantly reduced, and in some cases eliminated, using the process of this invention. Deflavored whey protein as produced by the present invention can be used in a wide variety of food products, and at higher levels than has been possible before, thereby providing nutritionally superior food products. Deflavored whey proteins can be prepared from, for example, whey obtained from conventional cheese making processes, whey protein isolate, whey protein concentrate, and the like.

Adjustment of pH using membrane electrodialysis. Membrane electrodialysis is used to adjust the pH of whey protein materials. The use of membrane electrodialysis provides a method for adjusting pH without the addition of acid or base. As such, salts and precipitates that may form with the addition of acids and bases and not formed and their removal is not required. Moreover, changes in organoleptic properties associated with addition of either acid or bases are avoided.

As shown in FIGS. 2 through 5, membrane electrodialysis may be conducted using a bipolar membrane and cationic membranes. The membranes are disposed between a cathode and anode and subjected to an electrical field. The membranes form separate compartments and materials flowing through those compartments may be collected separately. An example of an electrodialysis apparatus containing ion-selective membranes is EUR6 (available from Eurodia Industrie, Wissous, France). Suitable membranes are available from Tokuyama (Japan). A bipolar membrane includes a cationic membrane and an anionic membrane joined together. Of course, other apparatus and membranes could be used.

In accordance with one aspect, an aqueous mixture of whey protein material is contacted with the ion-selective membranes. Aqueous materials may be processed in a batch mode, semi-continuous mode, or continuous mode by flowing an aqueous solution over the ion-selective membranes. When using batch, semi-continuous, or continuous processing, an electrical potential is applied across the anode and cathode for a time effective for providing composition with the desired pH. Processing times in a batch mode and flow rates in a semi-continuous mode or continuous mode are a function of the number of ion-selective membranes and the electrical potential applied. Hence, the resulting composition can be monitored and further processed until a desired pH is achieved. Alternative membrane configurations are provided in the Figures. Other variations in membrane configuration are expected to achieve the same results.

Figure 2:
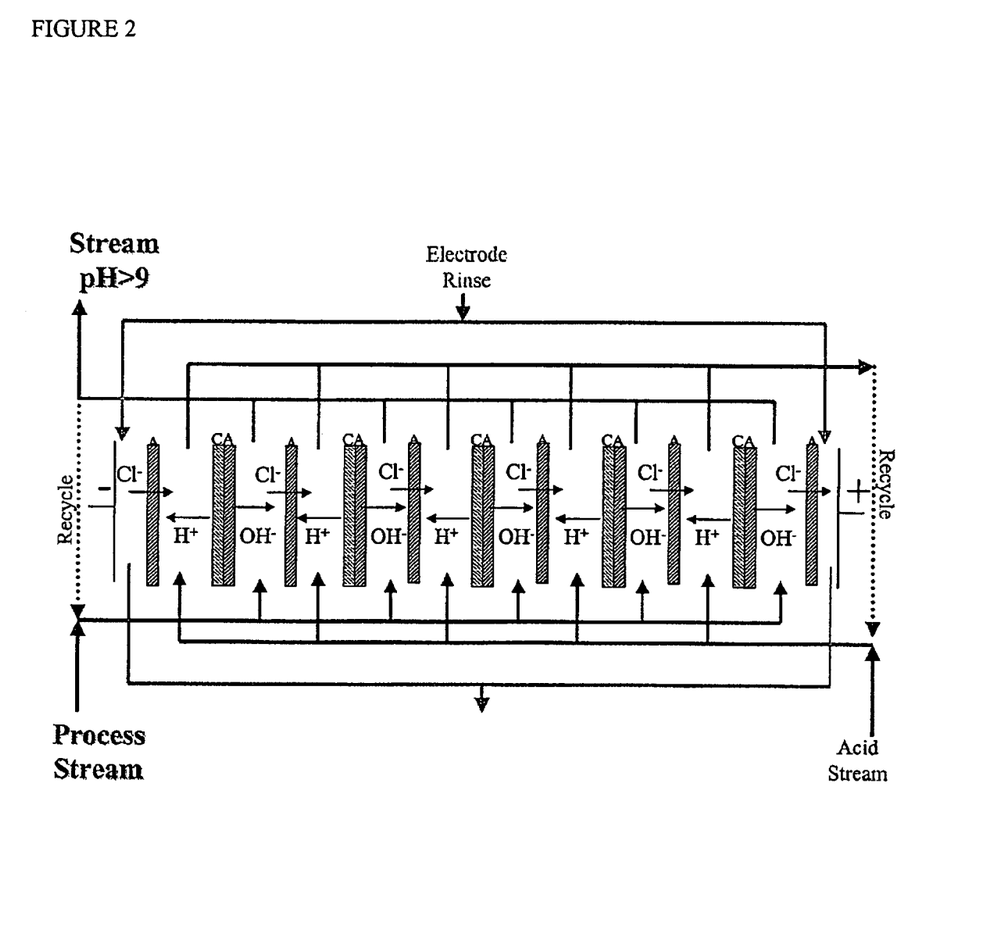
FIG. 2 is one example of a membrane electrodialysis system for increasing pH.
Figure 3:
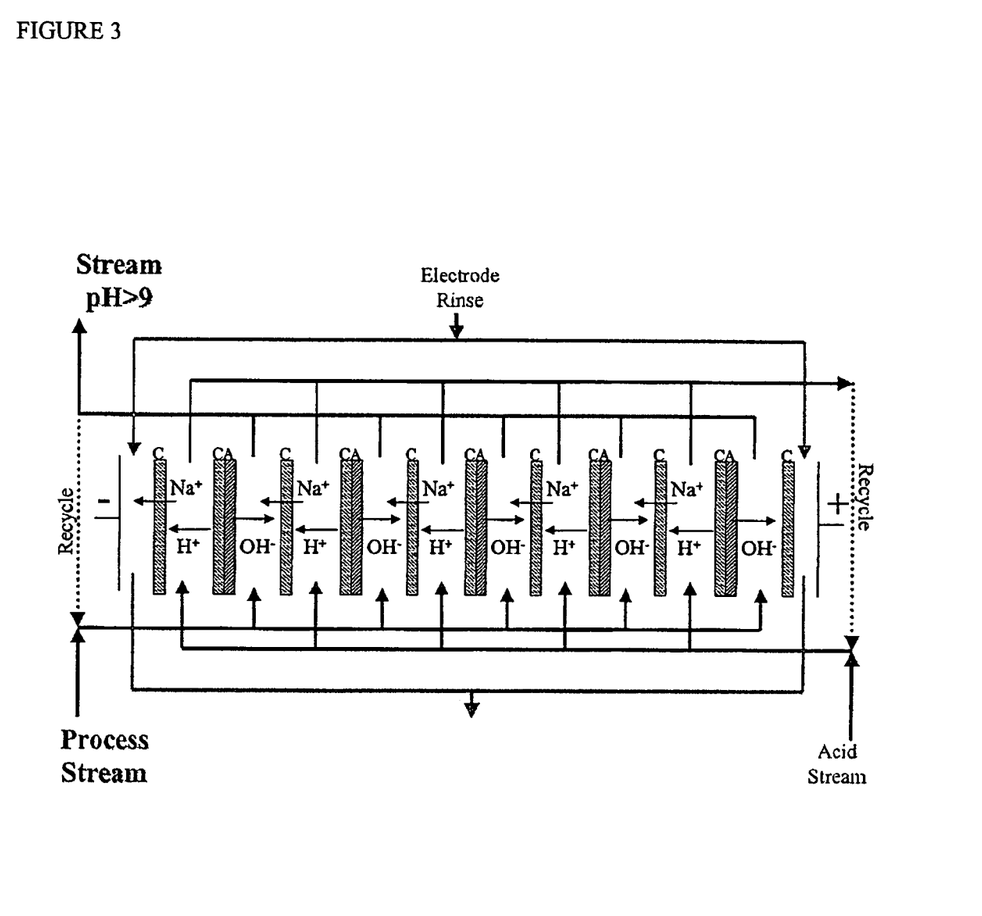
FIG. 3 is another example of a membrane electrodialysis system for increasing pH.

As shown in FIGS. 2 and 3, the pH of the whey protein materials may be adjusted to a pH range of about 8.0 to about 12 by contacting the aqueous solution with at least one, preferably a plurality of bipolar membranes that includes anionic membranes on both sides of the bipolar membrane. Materials from the compartments to the right of the bipolar membranes are collected for subsequent use. Materials collected from the compartments to the left of the bipolar membranes may be recirculated back through the membranes or circulated to a second membrane electrodialysis as many times as are need to provide an aqueous solution having a pH of about 8.0 to about 12. Materials from the compartments to the right of the bipolar membranes may be recirculated back through the membranes. Materials from the compartments adjacent to the anode and cathode may be recirculated back through the membranes.

Figure 4:
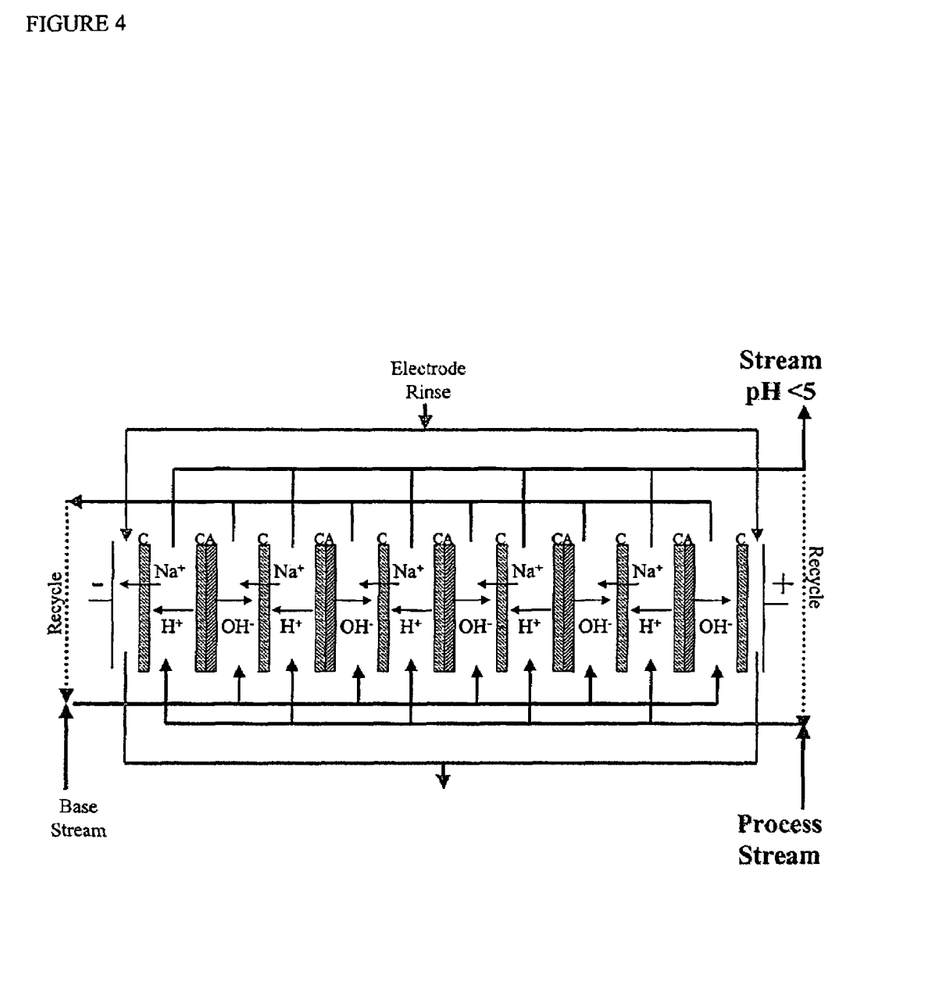
FIG. 4 is one example of a membrane electrodialysis system for decreasing pH.
Figure 5:
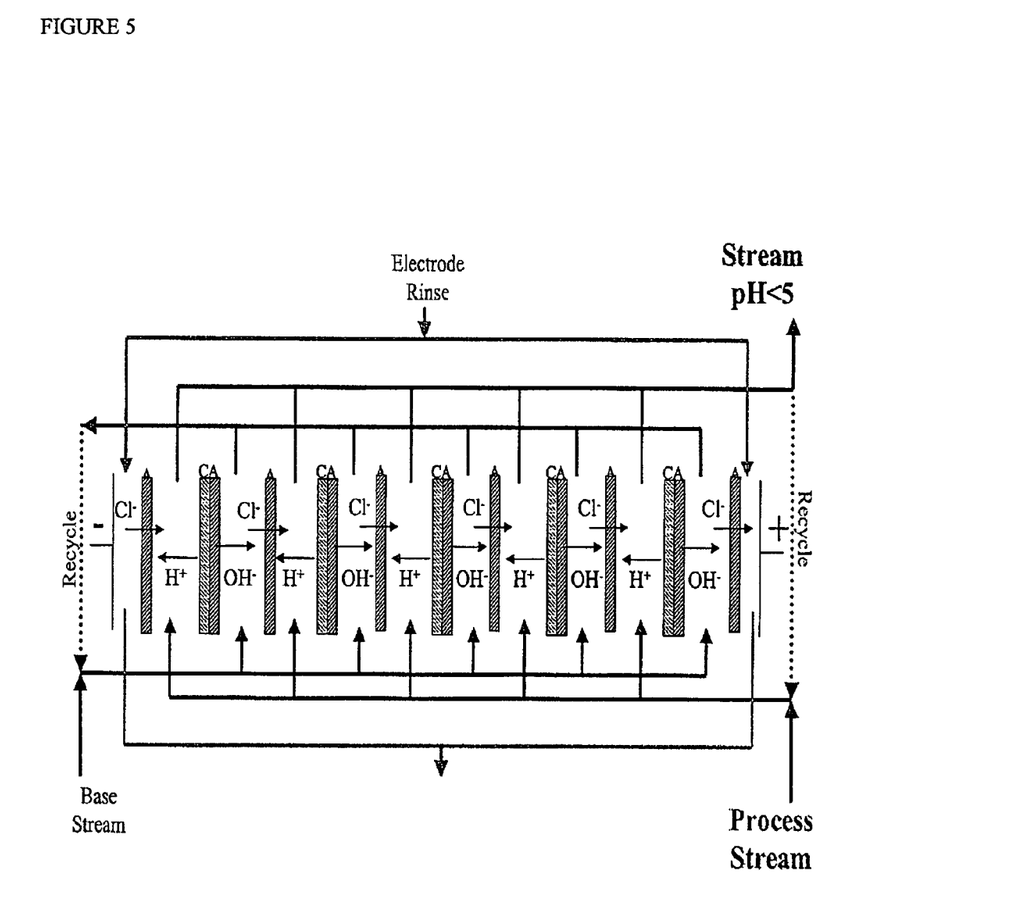
FIG. 5 is another example of a membrane electrodialysis system for decreasing pH.

As shown in FIGS. 4 and 5, the pH of the deflavored whey protein materials may be adjusted to a neutral or acidic pH range by contacting the aqueous solution with at least one, preferably a plurality of bipolar membranes that includes cationic membranes on both sides of the bipolar membrane. Materials from the compartments to the left of the bipolar membranes are collected for subsequent use. Materials collected from the compartments to the right of the bipolar membranes may be recirculated back through the membranes or circulated to a second membrane electrodialysis as many times as are need to provide an aqueous solution having the final desired pH. Materials from the compartments to the left of the bipolar membranes may be recirculated back through the membranes. Materials from the compartments adjacent to the anode and cathode may be recirculated back through the membranes.

Figure 1:
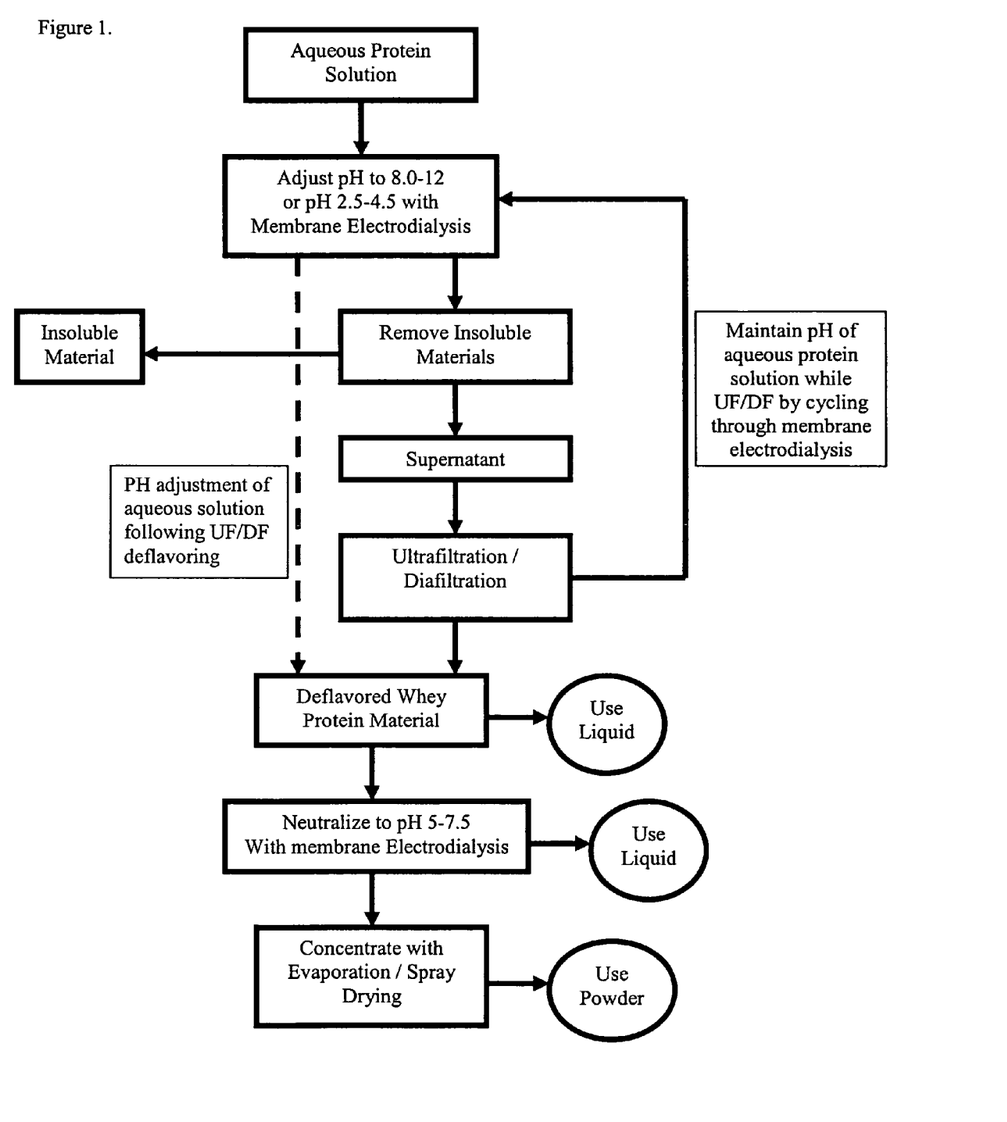
FIG. 1 is a block diagram of one embodiment of the invention.

As further shown in FIG. 1, the pH-adjusted aqueous solution is then treated to remove insoluble materials. Any conventional technique (e.g., filtration, decantation, centrifugation, and the like) can be used. Preferably, the insoluble material is removed by centrifugation. Commercial available continuous centrifugation units are ideally suited for this separation in a semi-batch or continuous type operation. In an especially preferred embodiment, the pH-adjusted aqueous is subjected to the removal technique (e.g., centrifugation) at least twice in order facilitate or more completely removed of insoluble materials.

Ultrafiltration Membranes. In the present invention, ultrafiltration is used to remove flavoring compounds from whey protein materials. Importantly, the pH of the whey protein material should be maintained in the range of about 8 to about 12 during the ultrafiltration process by circulating materials back through the membrane electrodialysis apparatus and/or by addition of acid or base. Ultrafiltration is intended to remove particles having a size between 10 to 1,000 Angstroms (0.001 to 0.1 µm), corresponding generally to particles having a molecular weight between 10,000 and 1,000,000, and which may also be affected by the shape of such high molecular weight particles. Whey proteins have molecular range between about 14,000 and 100,000. A typical analysis of whey proteins is provided in the table below:

| Whey Protein Faction | MW (daltons) | Percentage of Total Whey Proteins |
| --- | --- | --- |
| Beta-lactoglobulins | 18,300 | 50 |
| Alpha-lactoalbumin | 14,000 | 12 |
| Immunoglobulins | 15,000-100,000 | 10 |
| Bovine Serum Albumin | 69,000 | 5 |
| Proteose-peptones | 4,100-41,000 | 23 |

A membrane may be chosen which is capable of passing all of the whey proteins or only a selected portion. In the present invention, the whey proteins are retained by the ultrafiltration membrane under the selected operating conditions, while the lower molecular weight flavoring compounds pass through the membrane and are separated, thus improving the color and flavor of the retained whey proteins and associated solids.

A polymer ultrafiltration membrane may be defined as an anisotropic (non-uniform) layer. One face is a skin containing pores which determine the size of molecules which can pass through the membrane. Supporting the surface skin is a spongy structure which extends to the opposite face. Such membranes are commonly made by coagulation of polymers in an aqueous bath. Typical polymers which are used include polysulfones, cellulose esters, poly(vinylenefluoride), poly (dimethylphenylene oxide), poly(acrylonitrile), which can be cast into membranes. Often, the membranes are formed into hollow tubes which are assembled into bundles, through which the solution to be filtered is passed. Alternatively, flat membrane sheets and spiral designs may be used. In commercial practice, pressure is applied to facilitate movement of the lower molecular weight compounds through the membrane. The membrane must be able to withstand the pressures used, making it important that the spongy supporting structure be uniform to avoid breaking the surface skin and bypassing the membrane.

In addition to the polymeric membranes just described, other materials have been used to make ultrafiltration membranes, such as ceramics, sintered metals, and other inorganic materials. The present invention is not limited to any particular type of membrane. In general, the membrane must be able to pass the flavoring compounds, which are believed to have molecular weights lower than 1,000 Dalton. More importantly, the membranes must be able to retain substantially all of the solubilized whey proteins. Thus, the membrane of the invention will have a molecular weight cutoff up to about 50,000 Daltons, preferably about 1,000 to 50,000 Daltons, more preferably 5,000 to 30,000 Daltons.

Process. The process of the invention includes the following steps:

(1) Prepare an aqueous mixture of the whey protein material. All types of whey protein materials are considered to be potential sources of whey protein for use in the present invention and ultimately for use in food products. Thus, for example, suitable whey protein materials includes whey obtained from conventional natural cheese and fresh cheese making processes (conventionally known as sweet whey and acid whey, respectively) whey protein isolate, whey protein concentrate, and the like. Thus, whey protein materials which contain whey proteins are provided in or combined into an aqueous mixture, generally a slurry of whey protein solids. The protein content is needed for food products, but as discussed above, it is believed to contain flavoring compounds which must be released in order that they can be separated. The separation of flavoring compounds is carried out in an aqueous mixture in which both the proteins and flavoring compounds are dissolved. The concentration of the whey protein materials in the aqueous mixture will be in the range of about 1 to about 50 percent. Generally, the concentration of whey protein materials after pH adjustment will change during the subsequent ultrafiltration step as water is removed with the permeate. The water will be replaced either periodically or continuously. For example, in diafiltration water is added to gradually dilute the retained proteins in a batch or semi-continuous process.

In cases where the original whey protein material is an aqueous solution (e.g., whey from a cheese manufacturing process), the material may be used as is, or additional water may be added or removed as desired to form the aqueous mixture. For dried whey materials (e.g., whey protein isolate, whey protein concentrate, and the like), water will, of course, need to be added to form the aqueous mixture.

(2) For the basic mode of operation, it has been found that a pH of about 8.0 or above is needed to maintain the solubility of the whey proteins during ultrafiltration, while a pH higher than about 12 is likely to cause undesirable degradation of the proteins. The pH may be adjusted and maintained using only membrane electrodialysis or in combination with acid or base. While in theory, any base might be used, sodium or potassium hydroxide are preferred, particularly potassium hydroxide. Other bases which may have application include calcium, magnesium and ammonium hydroxides.

Prior to proceeding to the next step, whey protein material may be treated to remove any water insoluble materials that may be present. The water insoluble materials that may be present may be removed from the pH-adjusted aqueous composition using at least one centrifugation step or by using at least one clarification step.

(3) Pass the pH-adjusted mixture, while maintaining the pH, adjacent to an ultrafiltration membrane having a molecular weight cutoff up to about 50,000 Daltons, remove the flavoring compounds as permeate, adjusting the deflavored protein solution to the desired pH, and remove the remaining whey proteins and other whey materials as retentate. In this aspect of the invention, substantially all of the soluble whey proteins are retained by the ultrafiltration membrane. As used herein, "substantially all" means at least about 80% of the starting proteins are retained by the ultrafiltration membrane, preferably about 85 to about 98% of the proteins are retained.

It is believed that maintaining the solubility of the whey proteins during ultrafiltration allows the flavoring compounds to remain in a form in which they can be removed; if the whey protein denature during ultrafiltration, the flavoring compounds may become bound or encapsulated by the whey proteins, thereby preventing or reducing the effectiveness of their removal. The flavoring compounds, which have relatively low molecular weight compared to the whey proteins are able to pass through the pores of the ultrafiltration membrane, while substantially all of the solubilized whey proteins are too large and are retained. Importantly, the pH should be maintained within the just described ranges (i.e., about 8.0 to about 12) during the ultrafiltration/diafiltration process to allow as much of the flavoring compounds as possible to be removed.

The third step may be carried out in a batch manner. However, in commercial applications of the process of the invention, the pH-adjusted aqueous mixture would be circulated continuously adjacent to an ultrafiltration membrane. Since water, and the flavoring compounds pass through the membrane as permeate and are discarded, additional water will be added to maintain the desired concentration of whey protein materials, which will tend to change the pH of the aqueous mixture. This water may be augmented by dewatering the permeate and recycling the recovered water to the feed stream. The pH of the water may be pH adjusted using membrane eletrodialysis. A pH-modifying material (e.g., base or acid as appropriate) can also be added as necessary to control the pH in the desired range (i.e., about 8.0 to about 12) directly to the ultrafiltration solution, to any recycled aqueous material, or to makeup water as desired.

(4) Neutralize the retentate and recover the whey proteins.

After removal of the flavoring compounds (i.e., after completion of the ultrafiltration process), further neutralization of the filtered solution may be accomplished by withdrawing product and subjecting the solution to membrane electrodialysis and/or by adding an acid or base as required to reach the desired pH. After pH adjustment, the aqueous mixture of whey proteins and other materials may be used directly in food products, or it may be concentrated or dried as required for the intended use. Preferably such neutralization does not cause the solution to pass through the isoelectric point of whey protein.

A process for deflavoring whey protein materials by ultrafiltration may be operated in various ways. The pH during the ultrafiltration/diafiltration process is maintained in the desired range (i.e., about 8.0 to about 12, and preferably about 9.5 to about 10.5. Several methods will be described, 1) continuous processing; 2) batch processing; and 3) semi-continuous processing. It is expected that commercial processes will adopt batch or semi-continuous operation, which should be better suited to production of food-grade whey protein products. A continuous process is generally shown in FIG. 1. In a continuous process an aqueous mixture of whey protein materials is pH adjusted with membrane electrodialysis to solubilize whey proteins and release flavor compounds and then passed adjacent an ultrafiltration membrane which permits the lower molecular weight flavoring materials to pass through its pores along with water (the permeate), leaving the higher molecular weight whey protein materials (the retentate) to be recirculated. A portion of the retentate will be withdrawn as deflavored product, from which the whey protein materials can be recovered as needed for the ultimate end use. Water will be added to replace that lost in the permeate and to provide a constant concentration of whey protein materials in the feed stream supplied to the ultrafiltration membrane. Although not essential to the process, the process of FIG. 1 includes additional processing of the permeate to recover a portion of the water using a reverse osmosis membrane for recycling to join the retentate and fresh whey protein materials. The advantage of such a step is in reducing the amount of fresh water which must be added to the process and removed in concentrating the permeate. Of course, the pH of the whey protein materials can be kept within the desired range with membrane electrodialysis and/or by appropriate addition of a base or acid, as appropriate, to the recycled or fresh water added to the process or by membrane electrodialysis and/or direct addition of base as desired.

In a batch process, a batch of whey protein material in an aqueous mixture is placed in a vessel, pH adjusted with membrane electrodialysis, and fed to an ultrafiltration membrane. The permeate is separated and the retentate is returned to the vessel. As the process proceeds, the whey protein material is depleted in the lower molecular weight flavoring compounds and water and becomes more concentrated in the desirable whey proteins. Periodically, water is added to the retentate to dilute it and provide a carrier for the flavoring compounds which are passed through the membrane. In a semi-continuous process the water is added continuously at the rate it is being removed in the permeate. The process is continued until all of the flavoring compounds have been removed and the retentate is sufficiently deflavored to become the product, which can be further processed as required for the ultimate end use. A batch or semi-continuous process may also include the concentration of the permeate, with recycle of separated water in a similar manner as that shown in FIG. 1.

The pH during the ultrafiltration/diafiltration process is maintained in the desired range (i.e., about 8.0 to about 12, and preferably about 9.5 to about 10.5) The pH may be adjusted with membrane electrodialysis or with addition of acid or base.

The ultrafiltration membrane will be operated with a pressure differential across the membrane which assists migration of the flavoring compounds, water and other materials which are capable of passing through the pores of the membrane, while not exceeding the physical strength of the membrane. The trans-membrane pressure (in versus out) will be about 20 psi to about 60 psi. Of course, these pressures could be varied based on the membrane's specifications and other operational concerns. The flow rate of the feed stream will provide sufficient residence time for significant permeate removal, but also will be high enough to provide turbulence so that the access of the feed stream to the membrane pores will not be hindered by solid deposits on the membrane walls. In an important aspect, the feed stream may be prefiltered prior to ultrafiltration to minimize fouling of the ultrafiltration membrane. One skilled in the art will understand that suitable operating parameters will be determined by experience with the materials being separated.

In a preferred embodiment (i.e., the basic mode of operation), the present invention provides a method for preparing deflavored whey protein material, said method comprising: (a) providing an aqueous composition of a whey protein material containing soluble whey proteins, flavoring compounds, and insoluble materials; (b) solubilizing the whey proteins by adjusting the aqueous composition of (a) to a pH in the range of about 8.0 to about 12 and releasing the flavoring compounds; (c) removing the insoluble materials from the pH-adjusted aqueous composition of (b) to obtain a treated aqueous composition; (d) passing the treated aqueous composition of (c) adjacent an ultrafiltration membrane having a molecular weight cutoff up to about 50,000 Daltons, while maintaining the pH in the range of about 8.0 to about 12, under suitable ultrafiltration conditions wherein the flavor compounds pass through the membrane, thereby deflavoring the whey protein material and retaining substantially all of the solubilized whey proteins; (e) adjusting the pH of the deflavored aqueous composition of (d) to the desired pH by membrane electrodialysis; and (f) recovering the solubilized whey proteins retained by the ultrafiltration membrane to obtain the deflavored whey protein material.

Deflavored Whey Protein Products. The deflavored whey protein solution may be used directly or it may be converted to a solid form if desired. Any conventional technique for removing water can be used. Generally, spray or freeze drying techniques are preferred.

The deflavored whey protein materials prepared by the present methods are ideally suited for use in dairy and non-dairy beverages, smoothies, health drinks, cheeses, cheese analogs, dairy and non-dairy yogurts, meat and meat analog products, cereals, baked products, snacks, and the like. Generally, such food products may contain up to about 40 percent deflavored whey proteins without significantly impacting organoleptic properties. More preferably, such food products contain about 10 to about 30 percent deflavored whey proteins. Using the deflavored whey protein of this invention it is now possible to incorporate whey protein in conventional food products at sufficiently high levels (generally sufficient to provide about 2.5 to about 30 g whey protein per single serving size (generally about 25 to about 100 g for solid food products and about 100 to about 300 ml for liquid food products)) to provide health benefits of whey protein. Prior to this invention, incorporation whey proteins at such levels generally resulted in significant off-flavors and, therefore, only very limited acceptance by consumers.

What is claimed is:

1. A method for preparing deflavored whey protein material, said method comprising:
   (a) preparing an aqueous composition of a whey protein material containing soluble whey proteins and flavoring compounds;
   (b) adjusting the aqueous composition of (a) to a basic pH in the range of about 8.0 to about 12 with membrane elecrodialysis, thereby releasing the flavoring compounds;
   (c) passing the pH-adjusted aqueous composition of (b) adjacent to an ultrafiltration membrane having a molecular weight cutoff up to about 50,000 Daltons, while maintaining the pH in the same range as adjusted in step (b), under suitable ultrafiltration conditions wherein the flavor compounds pass through the membrane, thereby deflavoring the whey protein material and retaining substantially all of the soluble whey proteins;
   (d) adjusting the pH of the deflavored aqueous composition of (c) to neutral (pH 6.5-8.0) or acidic (below pH 6.5) pH, but above the isoelectric point, and
   (e) recovering the soluble whey proteins retained by the ultrafiltration membrane to obtain the deflavored whey protein material.

2. The method of claim 1, wherein the whey protein material is at least one member of the group consisting of whey from a natural cheese or fresh cheese making process, whey protein isolate, and whey protein concentrate.

3. The method of claim 1, wherein the whey protein material is treated prior to step (c) to remove water insoluble material.

4. The method of claim 3, wherein the water insoluble material is removed from the pH-adjusted aqueous composition using at least one centrifugation step prior to step (c).

5. The method of claim 3, wherein the water insoluble material is removed using at least one clarification step prior to step (c).

6. The method of claim 2, wherein the aqueous composition of (a) has a concentration of whey protein material in the range of about 1 to about 50 percent.

7. The method of claim 3, wherein the aqueous composition of (a) has a concentration of whey protein material in the range of about 1 to about 50 percent.

8. The method of claim 2, wherein the ultrafiltration membrane has a cutoff in the range of about 1,000 to about 50,000 Daltons.

9. The method of claim 3, wherein the ultrafiltration membrane has a cutoff in the range of about 1,000 to about 50,000 Daltons.

10. The method of claim 2, wherein the ultrafiltration membrane has a cutoff in the range of about 5,000 to about 30,000 Daltons.

11. The method of claim 3, wherein the ultrafiltration membrane has a cutoff in the range of about 5,000 to about 30,000 Daltons.

12. The method of claim 10, wherein the ultrafiltration is carried out at a temperature in the range of about 10 to about 60° C. and a pressure of from 20 psi to 60 psi.

13. The method of claim 11, wherein the ultrafiltration is carried out at a temperature in the range of about 10 to about 60° C. and a pressure of 20 psi to 60 psi.

14. The method of claim 12, wherein the ultrafiltration membrane is a polymeric, ceramic, or inorganic membrane.

15. The method of claim 13, wherein the ultrafiltration membrane is a polymeric, ceramic, or inorganic membrane.

16. The method of claim 1, wherein the deflavored whey protein material is further treated to remove water to obtain a solid deflavored whey protein material.

17. The method of claim 3, wherein the deflavored whey protein material is further treated to remove water to obtain the deflavored whey protein material in a solid form.

18. The method of claim 7, wherein the deflavored whey protein material is further treated to remove water to obtain the deflavored whey protein material in a solid form.

19. The method of claim 1, wherein the deflavored whey protein material is spray dried to remove water to obtain the deflavored whey protein material in a solid form.

20. The method of claim 3, wherein the deflavored whey protein material is spray dried to remove water to obtain the deflavored whey protein material in a solid form.

21. The method of claim 7, wherein the deflavored whey protein material is spray dried to remove water to obtain the deflavored whey protein material in a solid form.

* * * * *

UNITED STATES PATENT AND TRADEMARK OFFICE
CERTIFICATE OF CORRECTION

PATENT NO. : 7,582,326 B2  Page 1 of 1
APPLICATION NO. : 11/209105
DATED : September 1, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1035 days.

Signed and Sealed this

Fourteenth Day of December, 2010

David J. Kappos
*Director of the United States Patent and Trademark Office*